Nov. 6, 1945.　　　F. T. COURT　　　2,388,308
RETRACTABLE SUPPORT
Filed Oct. 7, 1942　　　2 Sheets-Sheet 1
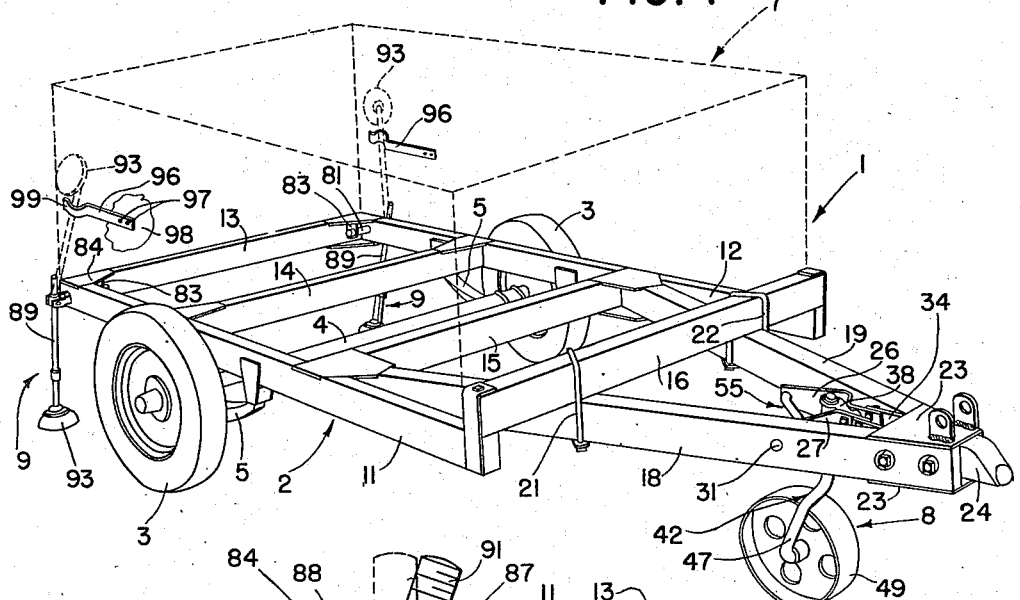
FIG. 1
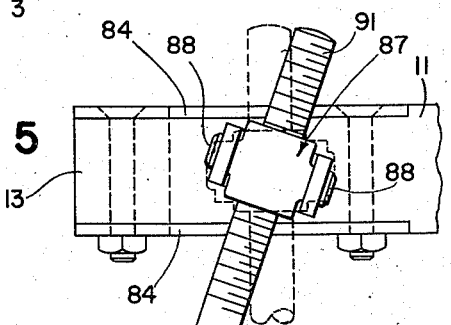
FIG. 5
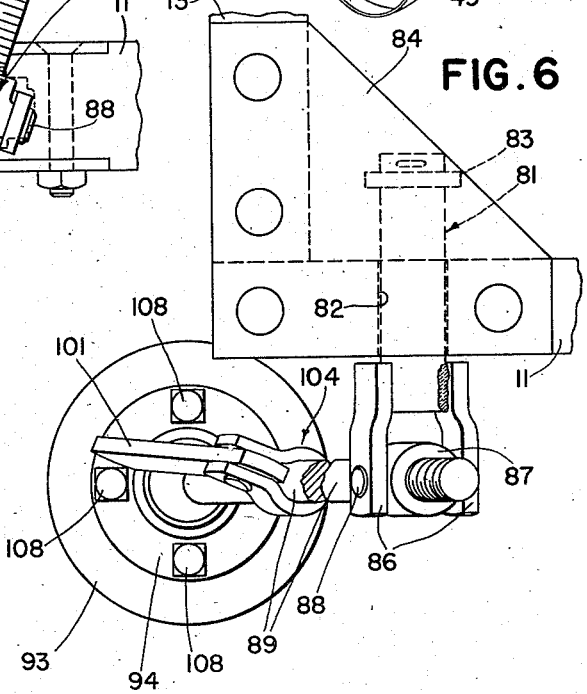
FIG. 6
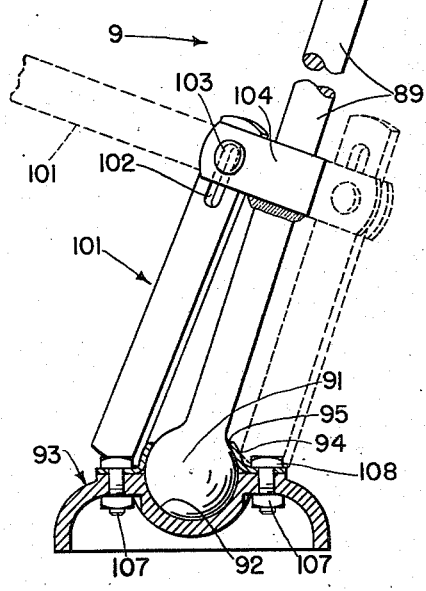
INVENTOR
Frank T. Court
BY
ATTORNEYS Nov. 6, 1945.  F. T. COURT  2,388,308
RETRACTABLE SUPPORT
Filed Oct. 7, 1942  2 Sheets-Sheet 2
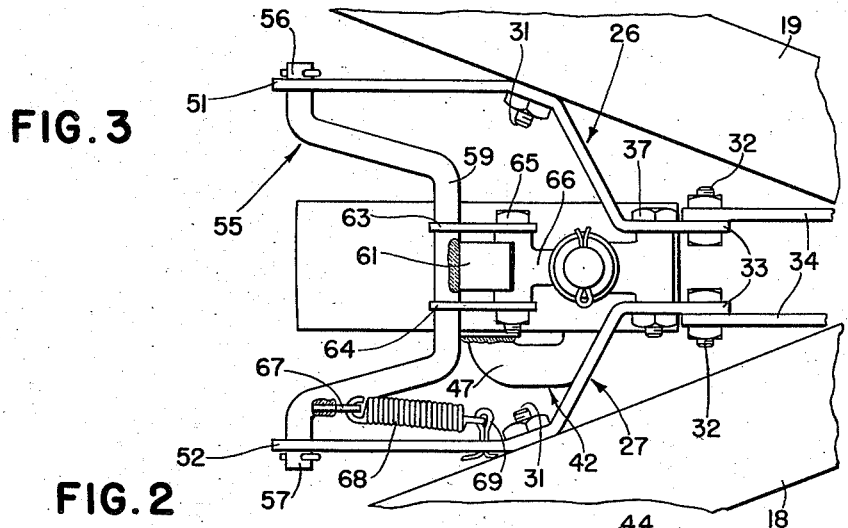
FIG. 3
FIG. 2
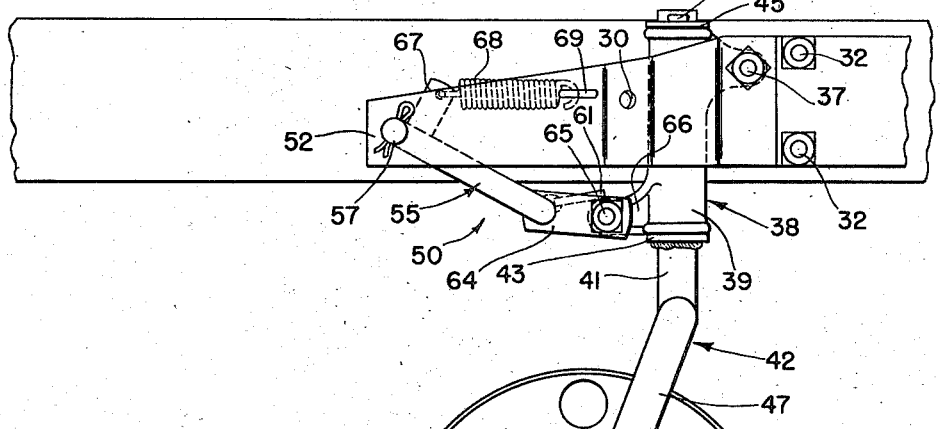
FIG. 4
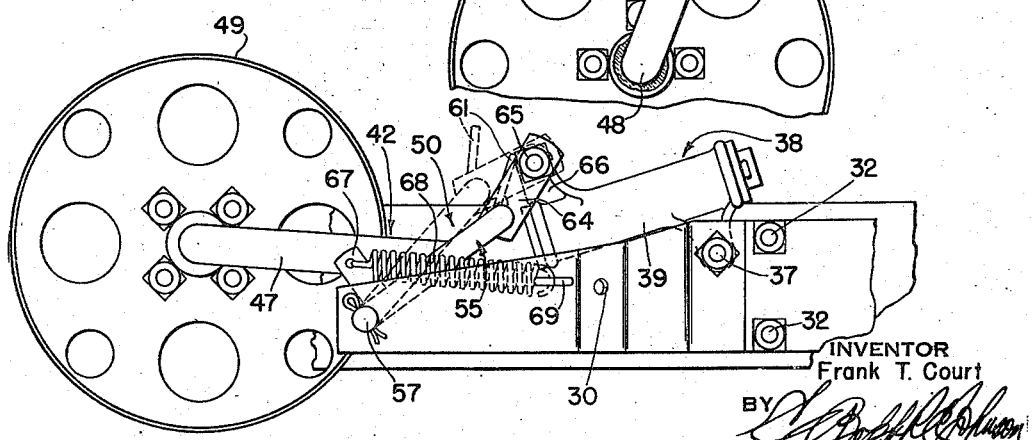
INVENTOR
Frank T. Court
BY
ATTORNEYS Patented Nov. 6, 1945

2,388,308

UNITED STATES PATENT OFFICE 2,388,308

RETRACTABLE SUPPORT

Frank T. Court, Moline, Ill., assignor to Deere & Company, Moline, Ill., a corporation of Illinois Application October 7, 1942, Serial No. 461,217

2 Claims. (Cl. 280—33.4)

The present invention relates generally to agricultural implements and more particularly to retractable supports for trailers and the like.

The object and general nature of the present invention is the provision of an improved trailer having a retractable front wheel support which is pivoted to the trailer frame and easily and quickly shifted from operative or supporting position to inoperative or non-supporting position and locked in either position by an overcenter arrangement which is simple and sturdy. Specifically, it is a feature of this invention to provide a pair of toggle links, one pivoted to the trailer frame and the other to the supporting member in such relation to the pivots that the toggle links may be disposed in their extended over-center position both when the ground support is in a lowered position and when it is in a raised or inoperative position. By virtue of this construction, it is unnecessary to have cranks or the like swing through 180 degrees, and therefore the mechanism may be simple and compact. It is also a feature of this invention to provide yielding means acting against one of the toggle links in both positions of the front end support and arranged so that the toggle links are yieldably held in their over-center position in both positions of the supporting member.

Another feature of this invention is the provision of a trailer having an improved rear end support which may easily and conveniently be swung up into and held in a raised or transport position, and swung downwardly into ground engaging position for relieving the wheels and/or springs of the weight when the trailer is stationary. More particularly, it is another feature of this invention to provide an improved foot arrangement particularly adapted to accommodate rough and uneven ground and also particularly arranged so that it may not only be easily manipulated but, moreover, securely held in supporting position without danger of loosening. It is also a feature of this invention to provide improved means for manipulating the supporting jacks.

These and other objects and advantages of the present invention will be apparent to those skilled in the art after a consideration of the following detailed description, taken in conjunction with the accompanying drawings in which the preferred form of the invention has been shown.

Referring now to the drawings:

Figure 1 is a perspective view of a two wheel trailer in which the principles of the present invention have been incorporated;

Figure 2 is a fragmentary side view of the front end support with which the trailer shown in Figure 1 is equipped;

Figure 3 is a top view of the structure shown in Figure 2;

Figure 4 is a view, similar to Figure 2, but showing the retractable front wheel support in a raised or inoperative position, the parts being shown in operative or lowered position in Figure 2;

Figure 5 is a side view of one of the rear jack supports for the trailer, the parts being shown in the position they occupy when, for some reason, the supporting foot or ground engaging part cannot be disposed directly under the rear of the trailer; and Figure 6 is a top or plan view of the structure shown in Figure 5.

Referring now to the drawings, the trailer, which is indicated in its entirety by the reference numeral 1 in Figure 1, includes a supporting frame 2, a pair of rear supporting wheels 3, connected by an axle 4 and springs 5 with the trailer frame 2, a body of any suitable construction, indicated at 7, and a retractable front supporting structure 8 and rear supporting structure 9. It is with the supporting structures for carrying the weight of the frame 2 and the load, more or less independent of the propelling means and the wheels 3, that the present invention is particularly concerned.

The frame 2 includes a pair of longitudinal bars 11 and 12 and a plurality of transverse bars 13, 14, 15, and 16 connected with the longitudinal bars by suitable gusset plates and other connections. The frame 2 also includes a pair of forwardly converging members 18 nd 19 connected by U-bolts 21 and 22 with the front cross bar 16. At their front ends the forwardly converging members are connected together by means of a pair of plates 23 and a trailer hitch casting 24. The front end of the trailer is supported on the retractable wheel assembly 8, and the latter includes a pair of side members or wheel supports 26 and 27, which are preferably identical parts except that one is right hand and the other is left hand, each being of generally Z-formation, as best shown in Figure 3. The support members 26 and 27 are secured to the frame members 18 and 19 by means of bolts 31 and 32, the latter connecting the forward or relatively close spaced portions 33 of the members 26 and 27 to sections 34 that are welded or otherwise fixed to the upper and lower plates 23. The forward closely spaced sections 33 of the side members 26 and 27 are apertured to receive a pivot bolt 37 on which a wheel-receiving pivot casting 38 is swingably mounted. The member 38 includes a sleeve or tubular section 39 in which the upper end 41 of a wheel receiving spindle 42 is disposed. A collar 43 is welded or otherwise fixed to the spindle section 41 and serves as a shoulder against which the lower portion of the sleeve section 39 bears. A cotter 44 and a washer 45 are disposed at the upper end of the spindle section 41 and hold the wheel spindle 42 in the sleeve section 39. The axle or wheel receiving spindle 42 includes a laterally disposed section 47 terminating in a lower end 48 on which a ground wheel 49 is journaled for rotation, being held thereon in any suitable manner. The wheel supporting means 38, 42 is swingable from a downwardly extending or suporting position rearwardly and upwardly into an inoperative or nonsupporting position, as shown in Figures 2 and 4, respectively.

According to the principles of the present invention, a simple toggle link assembly, indicated in its entirety by the reference numeral 50, is employed for locking or holding the retractable wheel support in either of its positions. The rear sections 51 and 52 of the side members 26 and 27 are relatively widely spaced apart and are generally parallel, the rear portions being apertured to receive a first toggle link in the form of a bail 55 having laterally directed ends 56 and 57 supported for rocking movement in the rearwardly directed sections 51 and 52 of the side members 26 and 27. The intermediate section 59 of the bail 55 is provided with a stop lug 61 welded or otherwise suitably fixed thereto and on opposite sides of which is a pair of links 63 and 64 pivotally or swingably connected with the intermediate section 59 of the bail 55, the links 63 and 64 constituting the other toggle member cooperating with the toggle bail 55. The other ends of the links 63 and 64 are pivotally connected, as by a pivot bolt 65, with a rearwardly extending lug 66 formed integrally with or carried by the pivot casting 38. The arm of the bail 55 that includes the end 57 carries a bracket 67 suitably secured thereto, as by welding, and a spring 68 is connected at one end to the bracket 67 and at the other end to a pin 69 carried by the side member 27, as best shown in Figure 3. As best shown in Figures 2 and 4, the tension of the spring 68 exerts a bias tending to swing the bail member 55 in a clockwise direction as viewed in Figures 2 and 4. Movement of the bail in this direction is limited, however, by the lug 61 engaging the lug 66 on the pivot casting 38, both in the upper as well as the lower position of the supporting wheel.

The operation of the retractable wheel support as just described is substantially as follows. Referring first to Figure 2, which shows a supporting or operating position, it will be seen that the wheel 49 will contact the ground rearwardly of the axis of the spindle section 41 so that in normal travel the wheel 49 swivels. Also, by virtue of this arrangement, the load on the wheel 49 tends to swing the pivot casting 38 in a clockwise direction about the pivot bolt 37, but this is prevented by the toggle 50 occupying an over-center position as determined by the engagement of the lug 61 with the lug 66, the parts being yieldably held in this position by the spring 68. When it is desired to transport the trailer with the wheel 49 in its non-supporting or inoperative position, the weight is taken off the wheel 49, as by supporting the front end of the trailer on the hitch socket 24, and then the operator manually swings the bail member 55 upwardly in a counterclockwise direction (Figure 2) against the tension of the spring 68, which thereby lifts the pivot casting 38 and the wheel spindle member 42, together with the wheel 49, up into the position shown in Figure 4. During this movement, the bail 55 and links 63, 64 take the position indicated in Figure 4 in dotted lines. Next, by grasping the wheel 49 or the spindle 42 so as to relieve pressure on the toggle members, the spring 68 will snap the toggle members over into their over-center position, as shown in full lines in Figure 4. Since now the toggle members are in their locked position, the wheel 49 and associated parts are held in their upper or transport position. In order to shift the position of the wheel 49 and spindle 42 back to their supporting position, all that it is necessary to do is to raise the bail 55 a slight amount, upwardly into the position shown in dotted lines, whereupon the weight of the wheel and associated parts will then swing the assembly down into the position shown in Figure 2, in which the spring 68 again snaps the toggle members into their over-center or locking position. It will be observed that only a relatively small movement of the toggle members is required to permit the wheel 49 to be raised or lowered as desired. According to the present invention, there is no necessity for swinging any part through 180 degrees, and therefore the complete retractable support unit can be made simple, sturdy and compact.

When the trailer 1 is to be detached from its propelling agency (not shown), and the front end to be supported on the retractable support unit 8, it is generally also desirable to relieve the springs 5 and wheels 3 by the provision of a pair of jacks at the rear of the trailer frame which can be manipulated into a ground engaging or supporting position so as to carry the weight of the frame and associated parts directly to the ground, thereby cooperating with the front wheel support 8 in relieving the tires and springs of the load.

Referring now more particularly to Figures 1, 5 and 6, each jack unit, indicated by the reference numeral 9, includes a supporting stub shaft 81 rockably supported in an opening 82 in the rear end of the associated frame bar 11 (Figure 6) and a bracket 83 welded to the gusset 84 that connects the frame member 11 with the rear cross frame member 13. The outer end of the stub shaft 81 carries yoke sections 86 which are apertured to receive an internally threaded trunnion member 87, having trunnions 88 pivotally supported in the shaft yoke sections 86. A rigid strut 89 having an upper threaded end 91 adjustably disposed in the trunnion member 87 is provided at its lower end with a ball 91 seating in a socket 92 formed in a jack base 93, best shown in Figure 5. The ball end 91 is held in its socket 92 by a socket plate 94 having an enlarged opening 95 through which the strut 89 extends. The plate 94 maintains the strut and base in assembled relation but accommodates relative pivotal movement in any direction. Each jack is adapted to be held in an upper non-supporting position by means of a spring clip member 96 secured, as by rivets or bolts 97 (Figure 1) to a side 98 of the trailer body 7, each of the jack receiving clips being formed of spring material and having an end bent, as at 99, to receive and retain the jack in upper position but permit ready disconnection therefrom when it is desired to swing the jacks downwardly into supporting position, as shown in full lines in Figure 1. When the jacks are in a supporting position with the base 93 of each in contact with the ground, the weight may be taken off the wheels 3 and transferred to the jacks by turning the struts in their associated trunnion members 87. According to the present invention, this may be done easily and conveniently by means of a handle 101 which comprises a strap member having a slot 102 at one end receiving a pin 103 that is carried in a handle bracket 104 that is welded to the strut or prop 89. Normally, the handle 101 lies along the strut 89, but when it is desired to rotate the part 89 in its socket member 87, the handle 101 is swung outwardly, as to the dotted line position shown in Figure 5, in which case the handle may then be used to turn the strut 89 in one direction or the other as desired. The handle 101 also serves as means for locking the strut 89 against being rotated by the weight of the load. As best shown in Figures 5 and 6, the plate 94 is secured to the base 93 by bolts 107, the head 108 of which are disposed in an upper position. After the strut 89 has been turned so as to raise the load off the springs 5, the handle 101 is then permitted to swing downwardly from its dotted line position (Figure 5) into its full line position with the lower end resting against the plate 94. Due to the bolt heads 108, it will be seen that any tendency for the strut 89 to rotate will be prevented by the end of the handle 101 engaging one or the other of the bolt heads 108. This is true whether the strut 89 happens to be in a substantially vertical position or in some inclined position, which is permitted by the ball and socket connection between the strut and the base 93. By virtue of the slot 102, the handle 101 will rest with its lower end against one of the bolt heads 108 in any position of the parts. A handle that not only turns the supporting strut 89 but also serves as a lock preventing any undesired rotation of the strut is believed to be broadly new. By virtue of the ball and socket connection between each strut and its associated base, the strut when in inoperative position (Figure 1) may be disposed quite close to the sides of the body, since the base 93 may be swung on the associated ball 91 into almost a vertical position, well within the planes of the wheels 3, so that there is little tendency for these parts to catch on overhanging shrubbery and the like.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A retractable support comprising a frame part, a support member having a ground engaging section and pivoted to said frame part for swinging movement between operative and inoperative positions, and a pair of interconnected toggle links, one pivoted to said support member and the other to said frame part, said toggle links being swingable into an over-center position and acting in compression when in said position for limiting the movement of said supporting member so as to hold the latter in one position, said links being swingable out of said over-center position to provide for movement of said support member into a transport position, said pivots being arranged so that as said support member moves into its other position said toggle links are moved into a second over-center position and again act in compression to lock the support member in its other position.

2. A retractable support comprising a part to be supported, a ground-engaging member swingably connected with said part and movable from a supporting position into a non-supporting position, a bail swingably connected with said part, a link pivoted at its opposite ends to said supporting member and said bail, respectively, and means defining a locked over-center position of said bail and link, the pivot connection between said link and member being spaced relative to the axis of swinging of said ground-engaging member on said part and to the pivot between said bail and said part so that said bail and link move into an over-center position both when the ground-engaging member is in its supporting position and when it is in its non-supporting position, said over-center position defining means including a part on the bail engageable with substantially the same portion of said ground engaging member in both of said over-center positions of said bail and link, the portion of said ground engaging member that is engaged by said part lying closely adjacent to the axis of pivotal connection between said link and said supporting member, and the points of pivotal connection between said bail, link, ground engaging member and said support being spaced so that said bail and link act in compression in both of said over-center positions for supporting in one case the load on said retractable support and, in the second position, for supporting the weight of said swingable ground engaging member.

FRANK T. COURT.